US009727180B2

(12) United States Patent
Azumi et al.

(10) Patent No.: US 9,727,180 B2
(45) Date of Patent: Aug. 8, 2017

(54) ELECTRONIC APPARATUS CONFIGURED TO CHANGE OPERATION OF SENSOR WHICH OUTPUTS INFORMATION FOR DETECTING POSITION ON DISPLAY DEVICE

(71) Applicant: Japan Display Inc., Minato-ku (JP)

(72) Inventors: Kohei Azumi, Tokyo (JP); Jouji Yamada, Tokyo (JP); Hirofumi Nakagawa, Tokyo (JP); Michio Yamamoto, Tokyo (JP); Makoto Hayashi, Tokyo (JP); Hiroshi Mizuhashi, Tokyo (JP); Kozo Ikeno, Tokyo (JP); Yoshitoshi Kida, Tokyo (JP)

(73) Assignee: Japan Display Inc., Minato-ku (JP)

( * ) Notice: Subject to any disclaimer, the term of this patent is extended or adjusted under 35 U.S.C. 154(b) by 60 days.

(21) Appl. No.: 14/187,798

(22) Filed: Feb. 24, 2014

(65) Prior Publication Data

US 2014/0292683 A1 Oct. 2, 2014

(30) Foreign Application Priority Data

Mar. 29, 2013 (JP) ................................ 2013-073876

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 3/0416* (2013.01)

(58) Field of Classification Search
None
See application file for complete search history.

(56) References Cited

U.S. PATENT DOCUMENTS

2008/0162996 A1* 7/2008 Krah .................... G06F 1/3203
345/173
2010/0182273 A1 7/2010 Noguchi et al.
(Continued)

FOREIGN PATENT DOCUMENTS

CN 101467119 A 6/2009
CN 102375606 A 3/2012
(Continued)

OTHER PUBLICATIONS

Office Action issued Jul. 7, 2015 in Japanese Patent Application No. 2013-073876 (with English language translation).
(Continued)

*Primary Examiner* — Amr Awad
*Assistant Examiner* — Donna Lui
(74) *Attorney, Agent, or Firm* — Oblon, McClelland, Maier & Neustadt, L.L.P.

(57) ABSTRACT

According to one embodiment, an electronic apparatus includes a sensor-equipped display device including a display device and a sensor which outputs information for detecting a contact position on the display device, a display driver which outputs a driving signal to the sensor based on one setting table, an application processor which outputs a table selection signal specifying a setting table and a sensor setting signal specifying a driving method of the sensor to the display driver, and a sensing circuit which outputs a dataset including three-dimensional information of a coordinate of a position on the display device and a physical quantity at the coordinate to the application processor, and outputs a table selection request signal generated based on the table selection signal, and a control signal which controls driving timing of the sensor to the display driver, the control signal having generated based on the sensor setting signal.

12 Claims, 9 Drawing Sheets

(56) References Cited

U.S. PATENT DOCUMENTS

| | | |
|---|---|---|
| 2010/0241957 A1 | 9/2010 | Kim et al. |
| 2012/0050217 A1 | 3/2012 | Noguchi et al. |
| 2012/0062370 A1 | 3/2012 | Feldstein et al. |
| 2012/0146928 A1 | 6/2012 | Lee |
| 2012/0268378 A1 | 10/2012 | Tokutake |
| 2013/0069895 A1* | 3/2013 | Lo .................. G06F 3/0416 345/173 |
| 2014/0022185 A1* | 1/2014 | Ribeiro et al. ............ 345/173 |
| 2014/0232663 A1* | 8/2014 | Singh .................. G06F 3/0418 345/173 |

FOREIGN PATENT DOCUMENTS

| | | |
|---|---|---|
| CN | 102375639 A | 3/2012 |
| CN | 102955611 A | 3/2013 |
| JP | 63-304313 A | 12/1988 |
| JP | 2005-284661 A | 10/2005 |
| JP | 2008-117371 A | 5/2008 |
| JP | 2009-244958 A | 10/2009 |
| JP | 2009-244958 A5 | 10/2009 |
| JP | 2010-97585 A | 4/2010 |
| JP | 2010-262460 A | 11/2010 |
| JP | 2011-13996 A | 1/2011 |
| JP | 2011-33550 A | 2/2011 |
| JP | 2011-86038 A | 4/2011 |
| JP | 2012-14500 A | 1/2012 |
| JP | 2012-48295 | 3/2012 |
| JP | 2012-178091 A | 9/2012 |
| JP | 2012-221423 A | 11/2012 |
| JP | 2013-506905 A | 2/2013 |
| JP | 2013-45466 A | 3/2013 |
| JP | 2014-501990 A | 1/2014 |
| TW | 201005602 | 2/2010 |
| TW | 201015397 | 4/2010 |
| TW | 201126394 A1 | 8/2011 |
| WO | WO 2012/099363 A2 | 7/2012 |
| WO | WO 2012/137790 A1 | 10/2012 |

OTHER PUBLICATIONS

Office Action mailed Feb. 25, 2016 in Taiwanese Application No. 103108511 (w/English translation).

Office Action issued Aug. 2, 2016 in Japanese Patent Application No. 2015-224036 (with English language translation).

Combined Chinese Office Action and Search Report issued on Jul. 28, 2016 in Patent Application No. 201410118878.5 (with English translation).

* cited by examiner

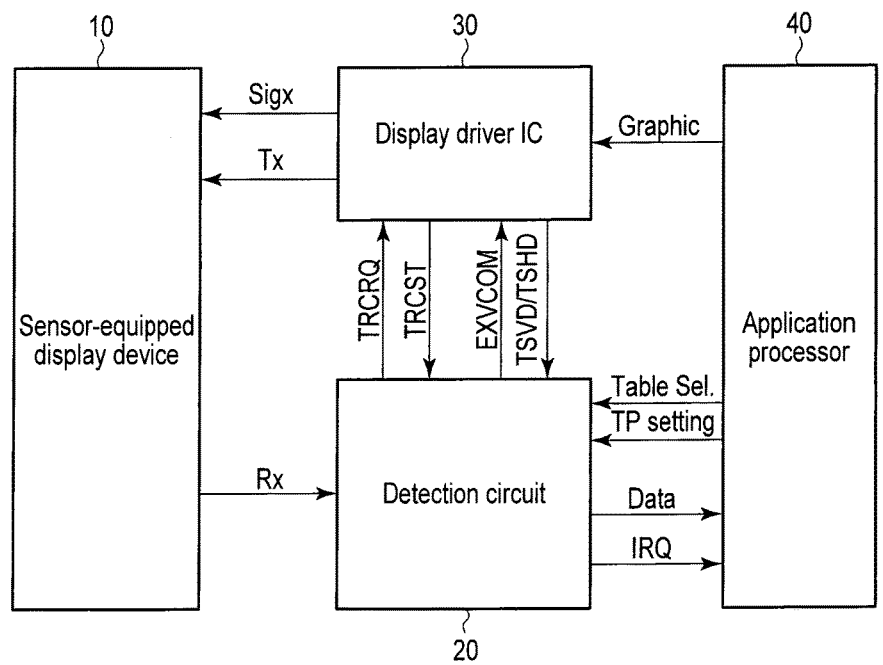
F I G. 1
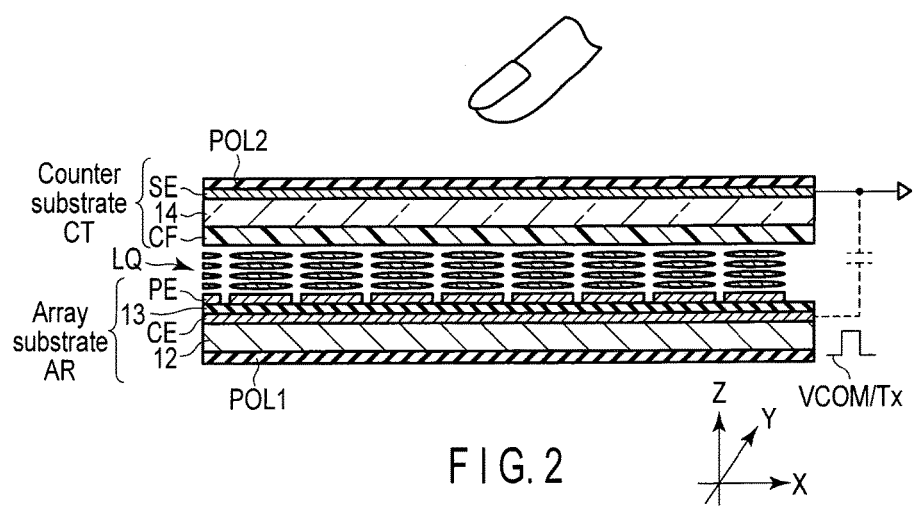
F I G. 2

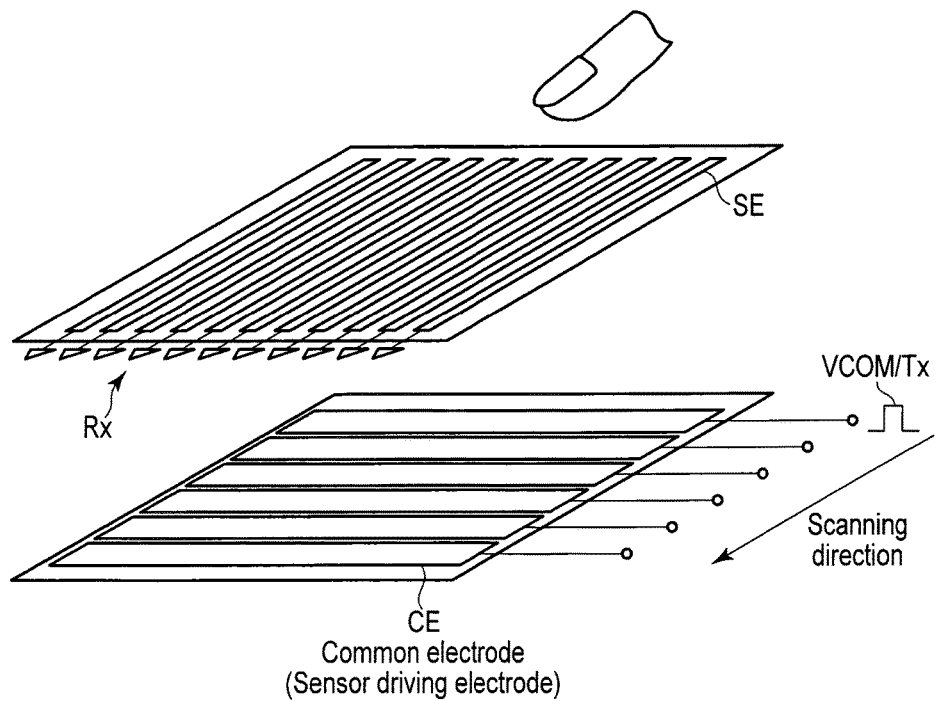
F I G. 3
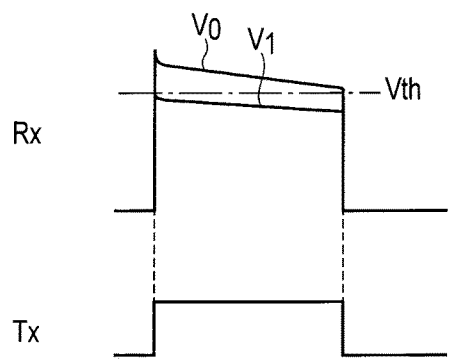
F I G. 4

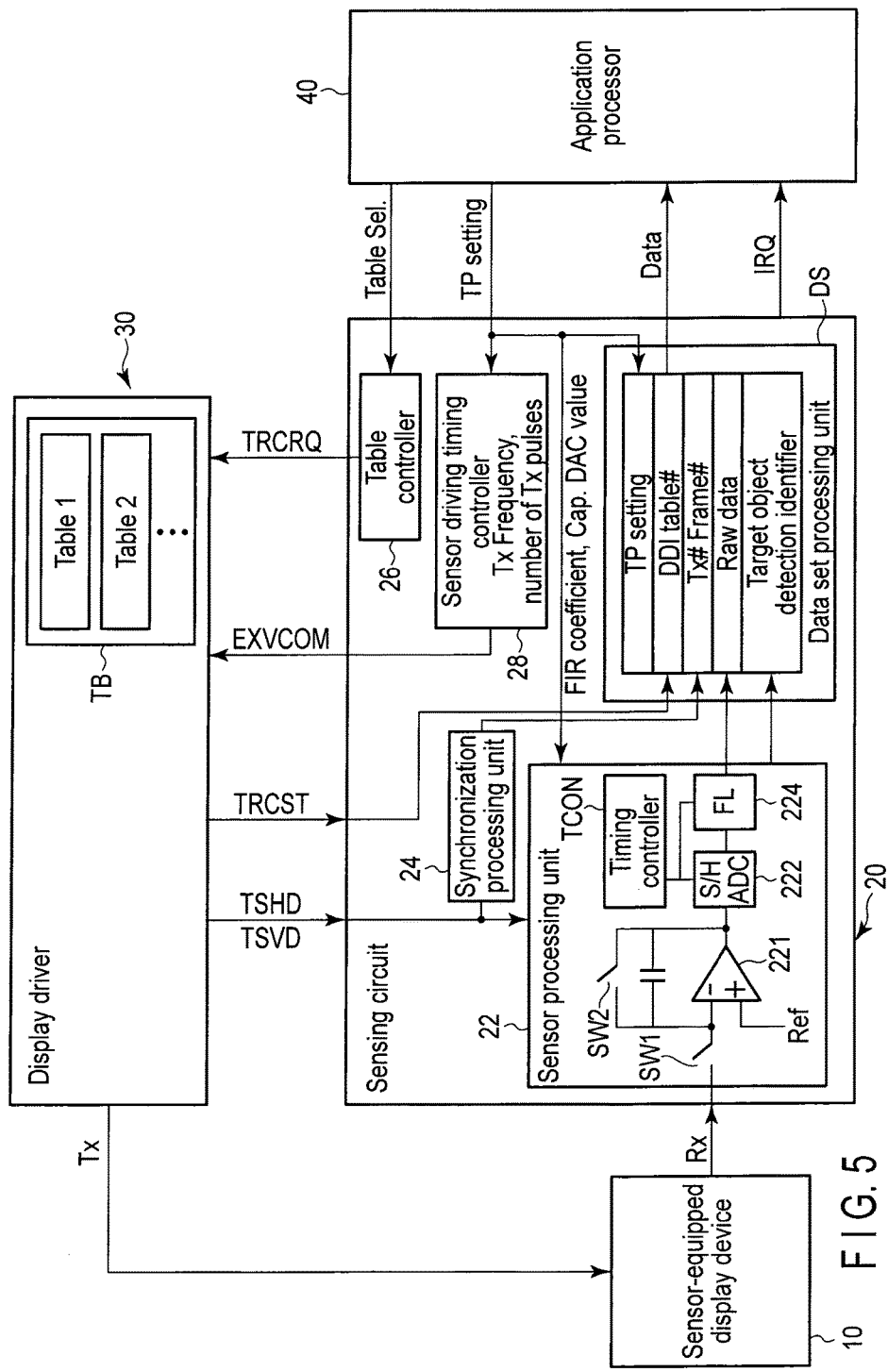
F I G. 5

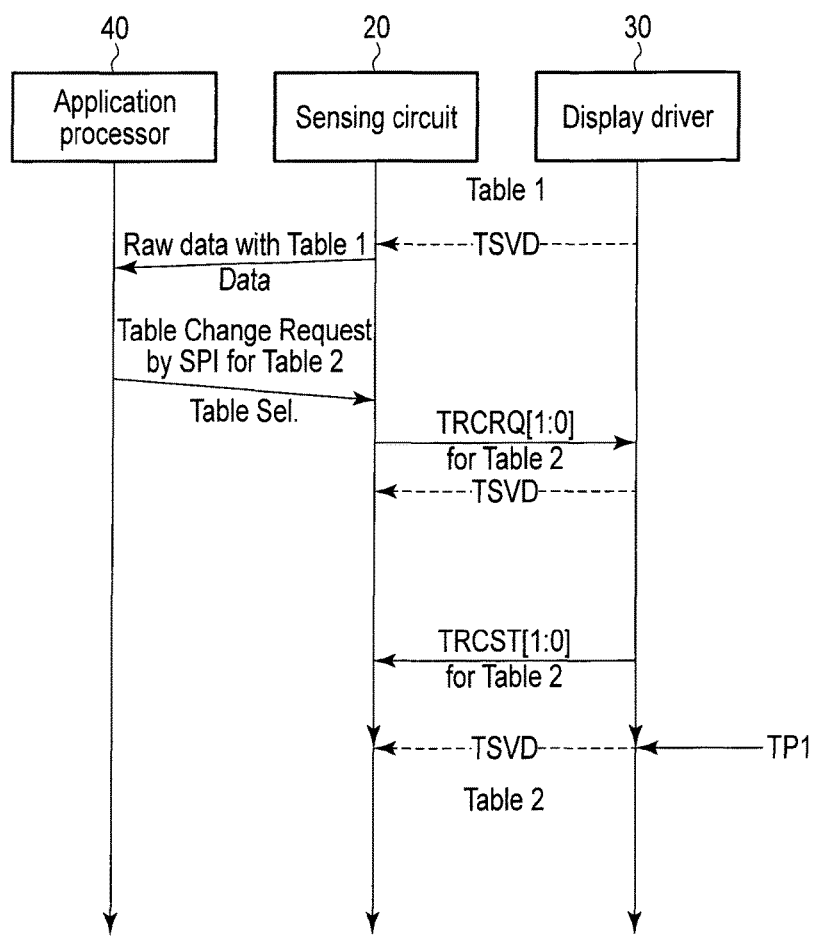
F I G. 7

ELECTRONIC APPARATUS CONFIGURED TO CHANGE OPERATION OF SENSOR WHICH OUTPUTS INFORMATION FOR DETECTING POSITION ON DISPLAY DEVICE

CROSS-REFERENCE TO RELATED APPLICATIONS

This application is based upon and claims the benefit of priority from Japanese Patent Application No. 2013-073876, filed Mar. 29, 2013, the entire contents of which are incorporated herein by reference.

FIELD

Embodiments described herein relate generally to an electronic apparatus and a control method of the electronic apparatus.

BACKGROUND

Portable electronic devices such as mobile phones, smartphones, tablet terminals and notebook computers are widely used. These electronic devices comprise, for example, an input panel which is integrally formed with a display panel. For example, when a user touches the display screen, the input panel detects the point of contact. The input panel comprises, for example, a sensor which detects capacitance change.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a schematic block diagram illustrating a structural example of an electronic apparatus of an embodiment.

FIG. 2 is a schematic cross-sectional diagram illustrating a structural example of a sensor-equipped display device shown in FIG. 1.

FIG. 3 is a perspective illustration for explaining a structural example of a common electrode and a sensing electrode of the sensor-equipped display device shown in FIG. 2.

FIG. 4 illustrates an example of a driving signal and a sensing signal of a capacitive sensor.

FIG. 5 is a schematic block diagram illustrating a structural example of a sensing circuit and a display driver of the electronic apparatus shown in FIG. 1.

FIG. 7 is a timing chart explaining an example of timing for sending and receiving a signal among structures when a table used in the display driver is changed.

DETAILED DESCRIPTION

Figure 6:
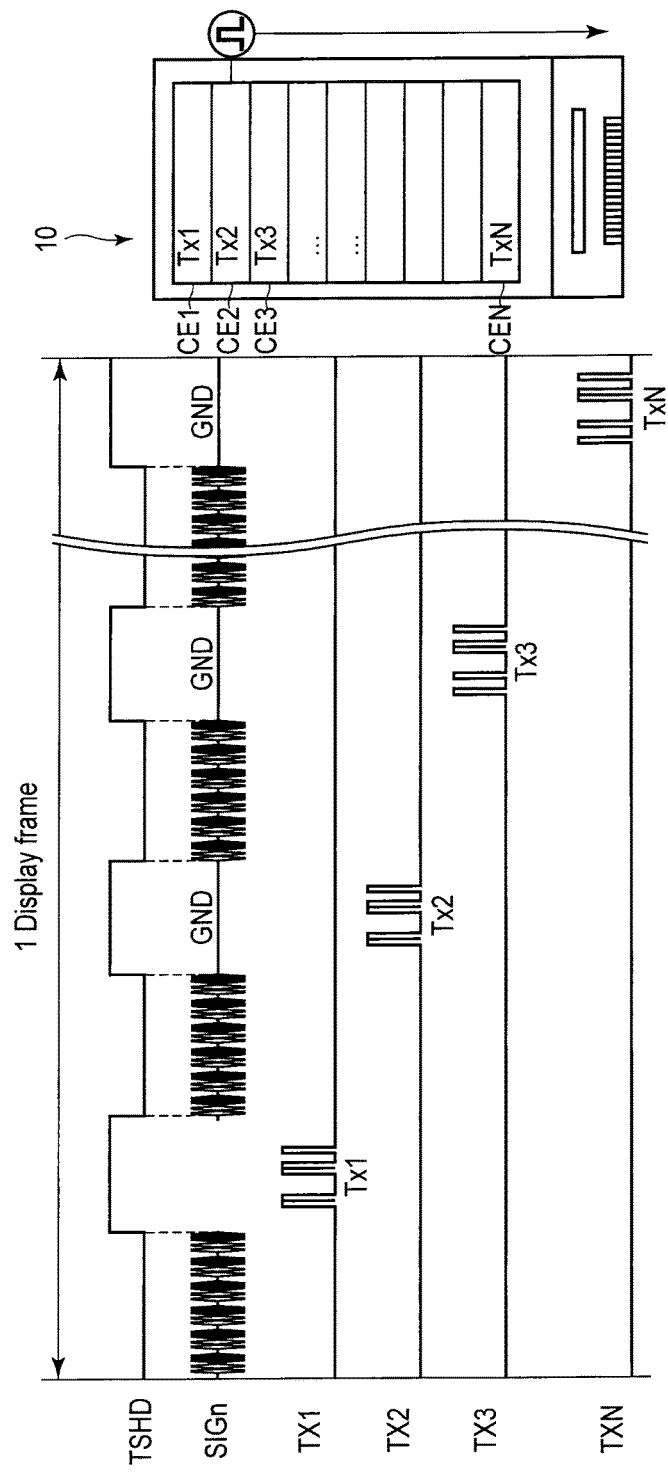
FIG. 6 is a diagram for explaining an example of timing for video signal writing and sensor driving in the electronic apparatus of the embodiment.

Various embodiments will be described hereinafter with reference to the accompanying drawings.

In general, according to one embodiment, an electronic apparatus includes: a sensor-equipped display device including a display device, and a sensor which outputs information for detecting a contact position on the display device; a display driver which comprises a plurality of setting tables, and, based on one setting table selected from the plurality of setting tables, outputs an image display signal to the display device and outputs a driving signal to the sensor; an application processor which outputs a table selection signal specifying a setting table to be selected and a sensor setting signal specifying a driving method of the sensor to the display driver; and a sensing circuit which outputs a dataset including three-dimensional information of a coordinate of a position on the display device and a physical quantity at the coordinate to the application processor, the coordinate having been obtained based on the information for detecting the contact position on the display device, and outputs a table selection request signal generated based on the table selection signal, and a control signal which controls driving timing of the sensor to the display driver, the control signal having been generated based on the sensor setting signal.

Hereinafter, an electronic apparatus of an embodiment and a control method of the electronic apparatus will be described in detail with reference to the accompanying drawings.

FIG. 1 is a schematic block diagram illustrating a structural example of an electronic apparatus of an embodiment.

The electronic apparatus of this embodiment comprises a sensor-equipped display device 10, a sensing circuit 20, a display driver 30 and an application processor 40.

The sensor-equipped display device 10 comprises a display device and a sensor. The sensor-equipped display device 10 outputs a detection value Rx of the sensor to the sensing circuit 20, displays an image in accordance with an image display signal Sigx received from the display driver 30, and drives the sensor in accordance with a sensor driving signal Tx.

The sensing circuit 20 generates a dataset Data by combining the detection value Rx received from the sensor-equipped display device 10 with data indicating various types of information, and outputs the dataset to the application processor 40. The sensing circuit 20 outputs a table selection request signal TRCRQ to the display driver 30 in accordance with a table selection signal (Table Sel.) received from the application processor 40. Further, the sensing circuit 20 outputs a control signal EXVCOM which controls driving timing of the sensor to the display driver 30 in accordance with a sensor setting signal (TP setting) received from the application processor 40.

The display driver 30 processes the graphic data received from the application processor 40 in such a way that the sensor-equipped display device 10 can display the graphic data, and outputs the processed data as the image display signal Sigx. The display driver 30 outputs the sensor driving signal Tx in accordance with control signal EXVCOM received from the sensing circuit 20.

From the dataset Data received from the sensing circuit 20, the application processor 40 conducts various processes by the use of the raw data (Raw data) based on the sensor detection value Rx. The application processor 40 obtains the state of the display driver 30 from the signal included in the dataset Data, controls the display driver 30 through the sensing circuit 20, and obtains synchronism between the sensing circuit 20 and the display driver 30.

FIG. 2 is a schematic cross-sectional diagram illustrating a structural example of the sensor-equipped display device 10 shown in FIG. 1. In FIG. 2, a first direction X and a second direction Y are substantially orthogonal to each other, and a third direction Z is substantially orthogonal to a plain face defined by the first direction X and the second direction Y.

The sensor-equipped display device 10 employs a liquid crystal display device as a display device. Further, the sensor-equipped display device 10 composes a capacitive sensor by sharing a part of an electrode (common electrode CE, explained later) provided in the liquid crystal display device and a display driving signal (common driving signal VCOM, explained later) provided in the liquid crystal display device.

The sensor-equipped display device 10 comprises an array substrate AR, a counter-substrate CT, and a liquid crystal layer LQ retained between the array substrate AR and the counter-substrate CT.

The array substrate AR comprises a first polarization plate POL1, a TFT substrate 12, a common electrode CE and a pixel electrode PE.

The TFT substrate 12 comprises a transparent insulating substrate such as glass, a switching element (not shown), various types of wiring lines (not shown) such as a source line and a gate line, and a planarization layer which is an insulating film covering the wiring lines. For example, the switching element is provided at a matrix state in the intersection of a source line and a gate line in a structure allocating the source and gate lines in a row direction which is the first direction X and in a column direction which is the second direction Y. The switching element switches the connection of the source line to the pixel electrode PE by the signal supplied to the gate line. As the switching element, in this embodiment, a thin-film transistor (TFT) is used.

The common electrode CE is provided on the TFT substrate 12 and is covered by an insulating layer 13. For example, the common electrode CE extends in the first direction X. In the second direction Y, a plurality of common electrodes CE are arranged. Each common electrode CE is formed from a transparent electrode material such as indium tin oxide (ITO) and indium zinc oxide (IZO). In this embodiment, the common electrode CE is also employed as a sensor driving electrode.

The pixel electrode PE is provided on the insulating layer 13 and is covered by an alignment film which is not shown in the figure. For example, the pixel electrode PE is arranged at a matrix state. At the matrix state, the first direction X is a row direction, and the second direction Y is a column direction. The pixel electrodes PE of a plurality of rows face a common electrode CE through the insulating layer 13. Each pixel electrode PE is formed from a transparent electrode material such as ITO and IZO.

The first polarization plate POL1 is provided on the principal surface which is the outside of the TFT substrate 12 (the side opposite to the common electrode CE).

The counter-substrate CT comprises a transparent insulating substrate 14 such as glass, a color filter CF, a sensing electrode SE and a second polarization plate POL2.

The color filter CF is provided, covering a black matrix which is allocated at a lattice state on the transparent insulating substrate 14. The black matrix is not shown in the figure. The color filter CF comprises, for example, a plurality of colored layers. The colored layers of the color filter CF are provided in adjacent pixels in the first direction X respectively, and have different colors from each other. For example, the color filter CF comprises colored layers formed from resin materials colored in three primary colors respectively, such as red, blue and green. A red-colored layer formed from a resin material colored in red is provided so as to correspond to a red pixel. (The red-colored layer is not shown in the figure.) A blue-colored layer formed from a resin material colored in blue is provided so as to correspond to a blue pixel. (The blue-colored layer is not shown in the figure.) A green-colored layer formed from a resin material colored in green is provided so as to correspond to a green pixel. The boundaries of these colored layers overlap the black matrix. The color filter (CF) is covered by an overcoat layer (not shown in the figure). The overcoat layer mitigates an influence of the unevenness of the surface of the color filter CF. The overcoat layer is covered by an alignment film which is not shown in the figure.

The sensing electrode SE is provided on the principal surface which is the outside of the transparent insulating substrate 14 (the side opposite to the color filter CF). The sensing electrode SE extends in the direction (second direction Y) substantially orthogonal to the direction (first direction X) in which the common electrode CE extends. A plurality of sensing electrodes SE are arranged in the first direction X. Each sensing electrode SE is formed from a transparent electrode material such as ITO and IZO.

The second polarization plate POL2 is allocated on the sensing electrode SE (on the opposite side of the transparent insulating substrate 14 to the color filter CF). The first polarization axis of the first polarization plate POL1 and the second polarization axis of the second polarization plate POL2 are, for example, orthogonal to each other (crossed Nicols). At this time, one polarization plate is provided, for example, in such a way that its polarization axis is parallel to or orthogonal to the initial oriented direction of a liquid crystal molecule.

FIG. 3 is a perspective view for explaining a structural example of the common electrode CE and the sensing electrode SE of the sensor-equipped display device shown in FIG. 2.

In this example, the common electrode CE is divided into a plurality of stripe-type of electrode patterns extending in the first direction X (right-and-left direction in the figure). When writing a video signal, the common voltage VCOM is supplied to each electrode pattern in series by the display driver 30, and line-sequential scanning driving is conducted on a time-division basis. At the time of sensor driving, the driving voltage Tx is supplied to each electrode pattern in series by the display driver 30.

In contrast, the sensing electrode SE is composed of a plurality of stripe-type of electrode patterns extending in the direction orthogonal to the direction in which the electrode patterns of the common electrode CE extend. The sensor detection value Rx is output from each electrode pattern of the sensing electrode SE, and is input to the sensing circuit 20 shown in FIG. 1.

FIG. 4 shows an example of the driving signal and the detection signal of a capacitive sensor.

The capacitive sensor comprises a pair of electrodes (the common electrode CE and the sensing electrode SE) which interpose a dielectric substance and face each other, and constitutes a first capacitive element.

One end of the first capacitive element is connected to an AC signal source. The other end is grounded through a resistance, and is connected to the sensing circuit 20 shown in FIG. 1. When an AC rectangular wave (driving signal Tx) of a predetermined frequency (for example, approximately a few kilohertz to a dozen kilohertz) is applied to the common electrode CE (one end of the capacitive element) from the AC signal source, an output waveform (sensor detection value Rx) shown in FIG. 4 appears in the sensing electrode SE (the other end of the first capacitive element).

When a finger does not contact, a current based on the capacitance value of the first capacitive element flows in association with discharge and charge relative to the first capacitive element. At this time, the waveform of potential of the other end of the first capacitive element is, for example, waveform V0 in FIG. 4, and the waveform V0 is detected by the sensing circuit 20.

In contrast, when a finger contacts, the second capacitive element formed by the finger is added to the first capacitive element in series. At this state, in association with discharge and charge relative to the first capacitive element and the second capacitive element, a current flows each. At this time, the waveform of potential of the other end of the first capacitive element is, for example, waveform V1 in FIG. 4, and the waveform V1 is detected by the sensing circuit 20. At this time, the potential of the other end of the first capacitive element is a partial potential determined based on the value of the current flowing through the first capacitive element and the second capacitive element. Therefore, waveform V1 is smaller than waveform V0 which is at the contactless state. Thus, whether a contact of a finger with the sensor is with or without is determined by comparing the sensor detection value Rx to threshold value Vth.

In the above explanation, the method for detecting whether or not a finger makes contact with the sensor is described. However, even when a finger does not contact with the sensor, the sensor detection value Rx changes. Therefore, hovering detection, etc., is also possible.

FIG. 5 is a schematic block diagram showing a structural example of the sensing circuit 20 and the display driver 30 of the electronic apparatus shown in FIG. 1.

The display driver 30 comprises a table selection unit TB which selects a table from a plurality of tables (Table 1, Table 2, . . . ). Values indicating display writing timing, the length of the detection period of the sensor (explained later), and a method for selecting an electrode pattern of the common electrode CE (single selection or multiple selection, etc.) are stored in each table. The display driver 30 controls timing of the image display signal Sigx and the sensor driving signal Tx by the use of the information which is stored in the table selected from a plurality of the tables by selecting one of a plurality of tables. For example, when the sensor is used in detecting a hovering movement, and when the sensor is used detecting a contact on the display device, a plurality of electrode patterns of the common electrode CE are preferably selected.

The sensing circuit 20 comprises a sensor processing unit 22, a synchronization processing unit 24, a table controller 26, a sensor driving timing controller 28 and a dataset processing unit DS.

The sensor processing unit 22 comprises an integrator 221, an A/D converter 222, a filter 224 and a timing controller TCON.

The integrator 221 receives a sensor detection value Rx from the sensor-equipped display device 10, and outputs a difference value from a threshold value Ref. The connection of the integrator 221 with the sensor-equipped display device 10 is switched by a switch SW1 allocated at the former stage of the integrator 221. A condenser and a switch SW2 are connected to the integrator 221 in parallel. The output of the integrator 221 is reset by switching the switch SW2. The switching of the switch SW1 and the switch SW2 is controlled by the timing controller TCON synchronized with the sensor driving timing signal EXVCOM.

The A/D converter 222 samples the value output from the integrator 221 at a predetermined timing, retains the value during a predetermined period, and outputs the value as a digital signal to the filter 224. The timing controller TCON synchronized with the sensor driving timing signal EXVCOM controls the sampling timing of the A/D converter 222 and the reset timing.

The filter 224 includes, for example, a digital filter such as an FIR filter. In the calculation by the filter 224, a coefficient (FIR coefficient) included in the sensor setting signal (TP setting) transmitted from the application processor 40 is used. After the operation, the filter 224 outputs the value calculated therein to the dataset processing unit DS as raw data (Raw data).

Figure 11:
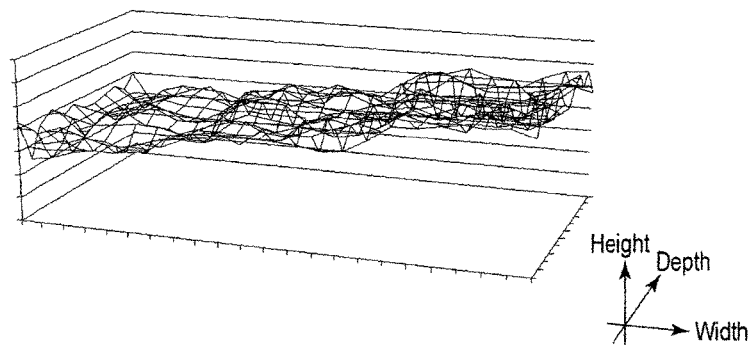
FIG. 11 illustrates an example of a sensor detection value Rx input in an integrator of a sensor processing unit.
Figure 12:
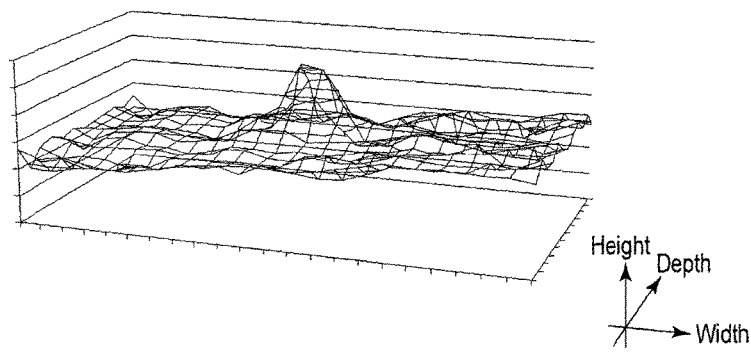
FIG. 12 illustrates an example of the sensor detection value Rx input in the integrator of the sensor processing unit.

FIG. 11 and FIG. 12 illustrate an example of a sensor detection value Rx input to the integrator 221 of the sensor processing unit 22. FIG. 11 illustrates an example of a sensor detection value Rx when a finger of a user, etc., is not close to the sensor. FIG. 12 illustrates an example of a sensor detection value Rx when a finger of a user, etc., is close to the sensor.

The sensor detection value Rx received by the integrator 221 is an output value of the sensing electrode SE when the sensor driving signal Tx is supplied to each electrode pattern (or electrode pattern group) of the common electrode CE. The sensor detection value Rx is three-dimensional information having information of a position coordinate formed by crossing an electrode pattern (or an electrode pattern group) of the common electrode CE and an electrode pattern of the sensing electrode SE and information of the physical quantity (capacitance value between electrodes or detection electrode voltage value) at the position.

Note that the raw data group is plotted in FIGS. 11 and 12 using the width direction (scanning direction by the sensor drive signal Tx) and the depth direction as positional coordinates and using the height direction as the physical quantity.

Figure 13:
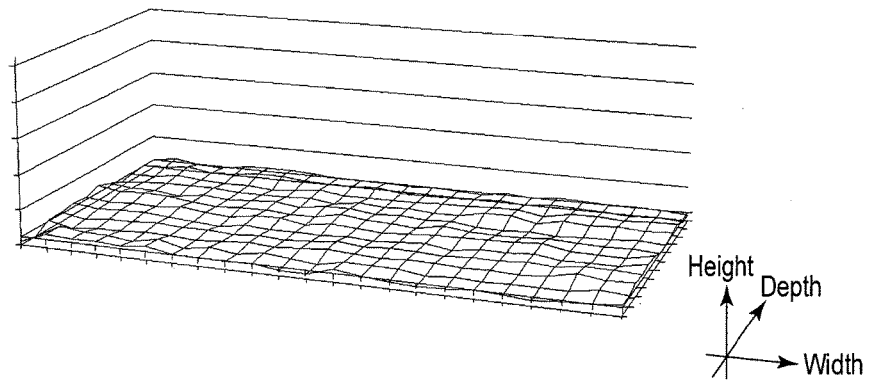
FIG. 13 illustrates an example of raw data (Raw data) output from the sensor processing unit.
Figure 14:
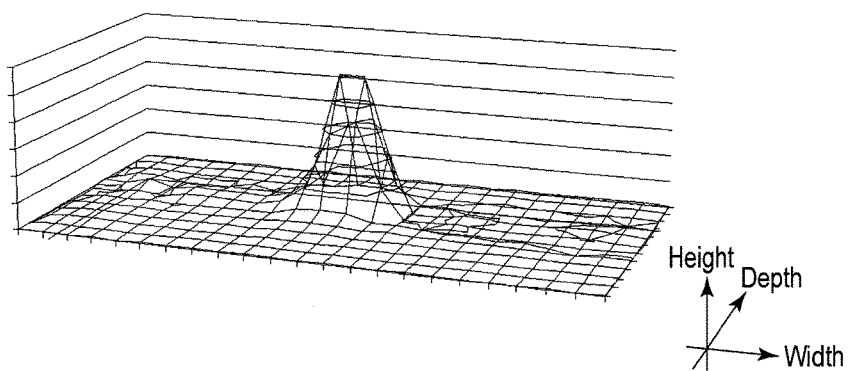
FIG. 14 illustrates an example of the raw data (Raw data) output from the sensor processing unit.

FIG. 13 and FIG. 14 illustrate an example of raw data (Raw data) output from the sensor processing unit 22. FIG. 13 illustrates an example of raw data (Raw data) when a finger of a user, etc., is not close to the sensor. FIG. 14 illustrates an example of raw data (Raw data) when a finger of a user, etc., is close to the sensor.

Similarly to the sensor detection value Rx, the raw data (Raw data) output from the filter 224 of the sensor processing unit 22 is three-dimensional information having information of a position coordinate formed by crossing an electrode pattern (or an electrode pattern group) of the common electrode CE and an electrode pattern of the sensing electrode SE and information of the physical quantity (capacitance value between electrodes or detection electrode voltage value) at the position. By removing noise components from the data output from the integrator 221, raw data (Raw data) further clearly indicates the position of the finger of a user, etc.

Note that the raw data group is plotted in FIGS. 13 and 14 using the width direction (scanning direction by the sensor drive signal Tx) and the depth direction as positional coordinates and using the height direction as the physical quantity.

The table controller 26 generates a table selection request signal TRCRQ based on the table selection signal (Table Sel.) received from the application processor 40, and outputs the table selection request signal TRCRQ to the display driver 30. The table selection signal (Table Sel.) is transmitted from the application processor 40 to the sensing circuit 20 in a structure based on serial communication standard such as SPI or I2C communication standard. The table controller 26 converts the received table selection signal (Table Sel.) into a parallel signal, and outputs the parallel signal.

The sensor driving timing controller 28 receives a sensor setting signal (TP setting) from the application processor 40. The sensor setting signal (TP setting) is transmitted from the application processor 40 to the sensing circuit 20 in a structure based on a serial communication standard such as SPI or I2C communication standard. The sensor driving timing controller 28 generates a sensor driving timing signal EXVCOM by the use of the frequency of the sensor driving signal Tx included in the sensor setting signal (TP setting) and the pulse number of the sensor driving signal Tx, and outputs the sensor driving timing signal EXVCOM to the display driver 30.

The pulse number and frequency of the sensor driving signal Tx are preferably changed so as to use the whole detection period (which is the period in which a horizontal synchronization signal TSHD is at H level as explained later) of the sensor stored for each table of the display driver 30. Therefore, the application processor 40 preferably changes the values of the frequency of the sensor driving signal Tx included in the sensor setting signal (TP setting) and the pulse number of the sensor driving signal Tx in accordance with the table to be used.

The synchronization processing unit 24 receives the horizontal synchronization signal TSHD and a vertical synchronization signal TSVD from the display driver 30, and distinguishes which electrode pattern (or electrode pattern group) of the common electrode CE was driven, and the frame period. The synchronization processing unit 24 outputs identification values (Tx#, Frame#) such as symbols and numbers which are set in advance in accordance with the distinguished electrode pattern and frame period to the dataset processing unit DS.

The dataset processing unit DS generates a dataset Data by combining the raw data (Raw data) received from the sensor processing unit 22, the sensor setting signal (TP setting) received from the application processor 40, a DDI table identification value (DDI table#) based on a table setting TRCST received from the display driver 30, an electrode pattern identification value (Tx#) output from the synchronization processing unit 24, a frame period identification value (Frame#) and a target object detection identifier, etc., with each other. The dataset processing unit DS outputs the dataset Data to the application processor 40. The dataset processing unit DS transmits the dataset Data in a structure based on a serial communication standard such as SPI or I2C. Prior to the output of the dataset Data to the application processor 40, the dataset processing unit DS outputs an interrupt request signal IRQ to the application processor 40.

The application processor 40 can confirm the reliability of raw data (Raw data) by comparing the dataset Data received from the sensing circuit 20 with various control signals output from the application processor 40 to the sensing circuit 20.

For example, if the application processor 40 confirms that the data does not include all of the electrode patterns (or electrode pattern groups), or data whose frame period number is different is mixed by comparing the electrode pattern identification value (Tx#) and the frame period identification value (Frame#) included in the dataset Data, the application processor 40 determines that the reliability of the dataset Data is low, and does not use the raw data (Raw data) included in the dataset Data for a process. In this case, the application processor 40 may be configured to request the retransmission of the dataset Data from the sensing circuit 20.

Next, an example of operations of the above electronic apparatus is explained with reference to the drawings.

FIG. 6 is a diagram for explaining an example of timing of video signal writing and sensor driving in the electronic apparatus of the embodiment.

One frame period is a period in which the vertical synchronization signal TSVD is at low (L) level. The sensor driving signal Tx is supplied to the electrode patterns (or electrode pattern groups) of the common electrode CE in each period in which the horizontal synchronization signal TSHD in the frame period is at high (H) level. In the frame period, the electrode patterns (or electrode pattern groups) of the common electrode CE are driven in series.

In this example, video signal writing and sensor driving are conducted on a time-division basis in the frame period. Here, electrode patterns (or electrode pattern groups) CE1 to CEN in an N line of the common electrode (CE) are driven in series in a frame period. When video signals are written into a plurality of lines, the common voltage VCOM is applied to the electrode patterns (or electrode pattern groups) CE1 to CEN corresponding to the image display. At the time of sensor driving, the sensor driving signal Tx is applied to the electrode patterns (or electrode pattern groups) CE1 to CEN corresponding to the sensor driving.

Next, an example of operations when the table used in the display driver 30 is changed is explained with reference to the drawings.

FIG. 7 illustrates a timing chart for explaining an example of timing for sending and receiving signals among structures when the table used in the display driver 30 is changed from Table 1 to Table 2.

Firstly, the display driver 30 outputs the vertical synchronization signal TSVD to the sensing circuit 20 at predetermined timing of the vertical synchronization signal TSVD, for example, the start time of a blank period.

After the sensing circuit 20 receives the vertical synchronization signal TSVD from the display driver 30, the dataset Data is output to the application processor 40.

After the application processor 40 receives the dataset Data from the sensing circuit 20, the application processor 40 conducts various processes by the use of the values included in the dataset Data. In the dataset Data, raw data (Raw data) and the table identification value (DDI table#) indicating Table 1 are included.

When the application processor 40 determines that the accuracy of raw data (Raw data) is bad, or when the sensor driving mode is changed in association with the user instruction for changing the setting, the application processor 40 outputs, for example, the table selection signal (Table Sel.) which is an instruction for changing the table to Table 2 to the sensing circuit 20. This table selection signal (Table Sel.) is transmitted in a structure based on serial communication standard such as SPI or I2C.

The sensing circuit 20 converts the table selection signal (Table Sel.) received from the application processor 40 into the table selection request signal TSCRQ, and outputs the table selection request signal TSCRQ to the display driver 30. Specifically, for example, table selection request signal TSCRQ is changed from low (L), indicating Table 1, to high (H), indicating Table 2.

When the table selection request signal TSCRQ at high (H) level is input to the display driver 30, the display driver 30 outputs the table setting TRCST indicating that the table is Table 2 to the sensing circuit 20. Specifically, for example, the table setting signal TRCST is changed from low (L), indicating Table 1, to high (H), indicating Table 2. The display driver 30 operates in line with the first vertical synchronization signal TSVD (timing TP1) processed after the table setting TRCST is changed to Table 2.

Figure 8:
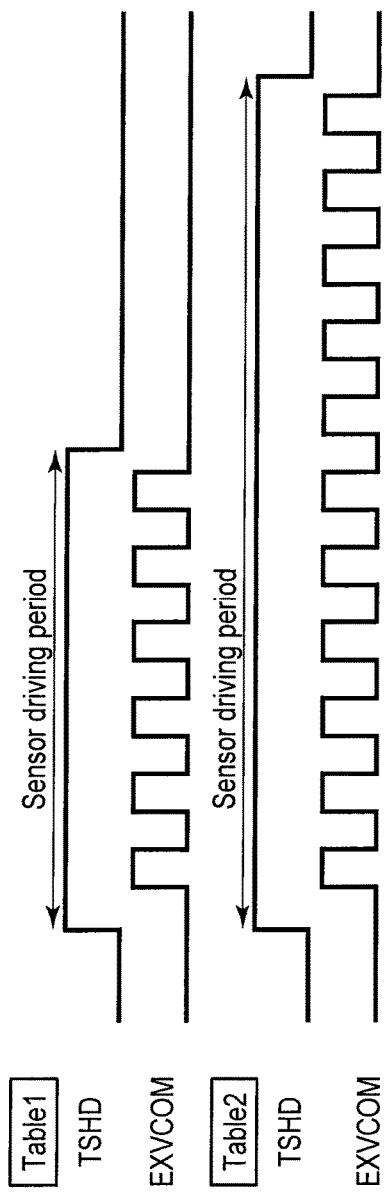
FIG. 8 illustrates an example of a sensor-driving timing signal when the table used in the display driver is changed.

FIG. 8 illustrates an example of a sensor driving timing signal when the table used in the display driver 30 is changed. Here, the frequency of the sensor driving signal Tx (sensor driving timing signal EXVCOM), the pulse width of the sensor driving signal Tx (width of Tx) and a method for driving the sensor are not changed between before and after the table is changed.

When the table used in the display driver 30 is changed from Table 1 to Table 2, the waveform of the horizontal synchronization signal TSHD is changed, and the detection period of the sensor is changed.

The sensor driving timing signal EXVCOM is generated based on the sensor setting signal (TP setting) output from the application processor 40. That is, by controlling the sensing circuit 20 and the display driver 30, the application processor 40 synchronizes the table used in the display driver 30 and the sensor driving timing signal EXVCOM with each other.

In the example shown in FIG. 8, since only the detection period of the sensor is changed, the pulse number of the sensor driving timing signal EXVCOM in each detection period is changed based on the sensor setting signal (TP setting).

Next, an example of operations when the frequency of the sensor driving signal Tx (sensor driving timing signal EXVCOM) is changed is explained with reference to the drawings.

Figure 9:
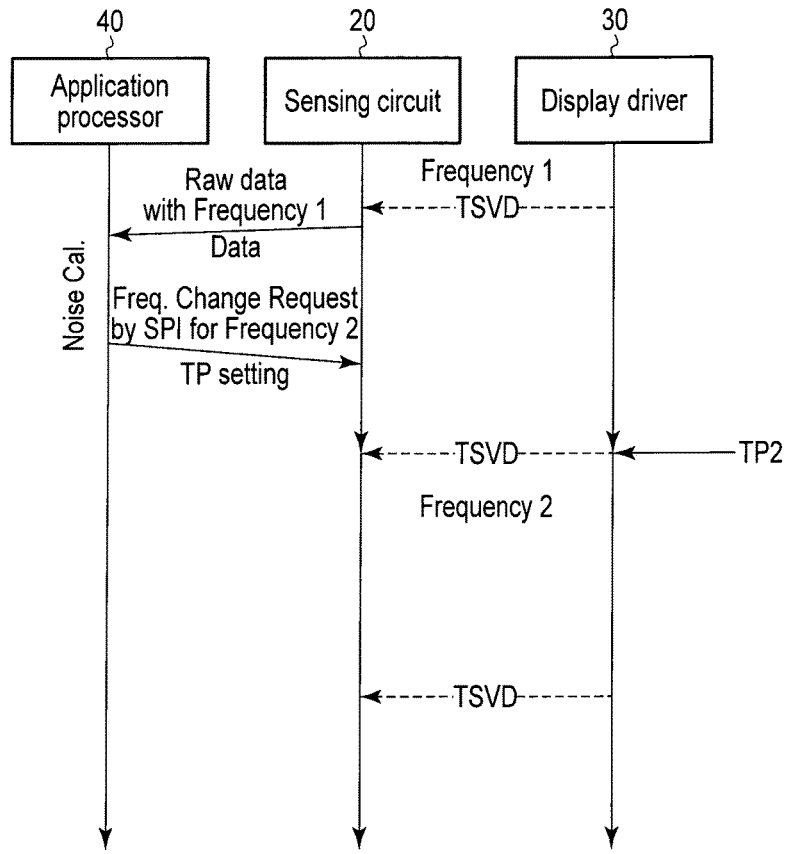
FIG. 9 is a timing chart explaining an example of timing for sending and receiving a signal among the structures when the frequency of a sensor driving signal is changed from a first frequency (Frequency 1) to a second frequency (Frequency 2).

FIG. 9 illustrates a timing chart for explaining an example of timing for sending and receiving signals among structures when the frequency of the sensor driving signal Tx is changed from the first frequency (Frequency 1) to the second frequency (Frequency 2).

Firstly, the display driver 30 outputs the vertical synchronization signal TSVD to the sensing circuit 20 at predetermined timing of the vertical synchronization signal TSVD, for example, the start time of a blank period.

After the sensing circuit 20 receives the vertical synchronization signal TSVD from the display driver 30, the dataset Data is output to the application processor 40.

After the application processor 40 receives the dataset Data from the sensing circuit 20, the application processor 40 conducts various processes by the use of the values included in the dataset Data. In addition to raw data (Raw data), the frequency of the sensor driving signal Tx used for generating the sensor driving timing signal EXVCOM by using the sensor setting signal (TP setting) is included in the dataset Data.

when the application processor 40 determines that the accuracy of raw data (Raw data) is bad, or when the sensor driving mode is changed in association with the user instruction for changing the setting, the application processor 40 changes, for example, the frequency of the sensor driving signal Tx of the sensor setting signal (TP setting) from the first frequency (Frequency 1) to the second frequency (Frequency 2), and outputs the sensor setting signal (TP setting) to the sensing circuit 20. This sensor setting signal (TP setting) is transmitted in a structure based on a serial communication standard such as SPI or I2C.

In the sensor driving timing controller 28, the sensing circuit 20 generates the sensor driving timing signal EXVCOM by the use of the frequency (second frequency: Frequency 2) of the sensor driving signal Tx included in the sensor setting signal (TP setting) received from the application processor 40. The sensing circuit 20 outputs the sensor driving timing signal EXVCOM of the second frequency (Frequency 2) from timing TP2 at which the blank period of the next sensor vertical period TSVD starts.

Figure 10:
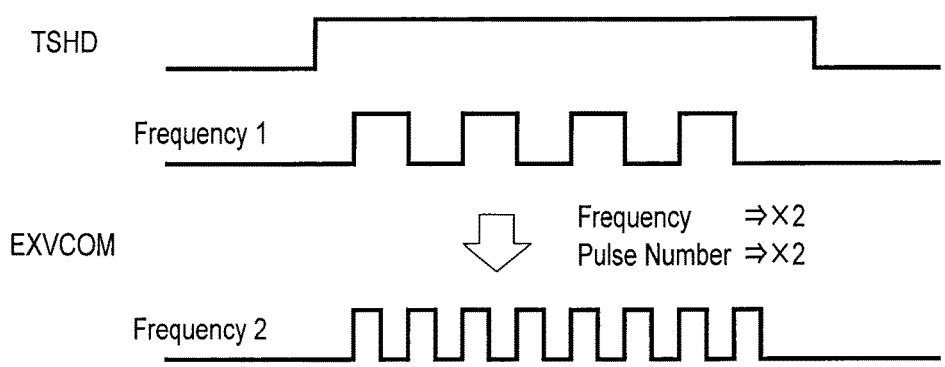
FIG. 10 illustrates an example of the sensor-driving timing signal when the frequency of a sensor driving signal Tx of a sensor setting signal (TP setting) is changed.

FIG. 10 illustrates an example of the sensor driving timing signal when the frequency of the sensor driving signal Tx of the sensor setting signal (TP setting) is changed. Here, the waveform of the horizontal synchronization signal TSHD is not changed between before and after the sensor setting signal (TP setting) is changed.

In this example, the second frequency (Frequency 2) is twice higher than the first frequency (Frequency 1). In this example, since the waveform of the horizontal synchronization signal TSHD is the same, if the frequency of the sensor driving signal Tx within the sensor setting signal (TP setting) is changed from the first frequency to the second frequency, the pulse number of the sensor driving signal Tx is also doubled, and the pulse width becomes approximately half.

As described above, in this embodiment, the application processor 40 outputs the sensor setting signal (TP setting) and the signal (Table Sel.) indicating the table used in the display driver 30 to the sensing circuit 20. The application processor 40 receives the dataset Data including the table identification value DDI Table# output from the display driver 30, the sensor setting signal (TP setting) and the differential value (raw data) between the detection value Rx and the threshold value Ref of the sensor. The application processor 40 conducts an operational treatment of the differential value (raw data) based on the received table identification value DDI Table# and sensor setting signal (TP setting).

Thus, the application processor 40 can conduct a control of the display driver 30 and the sensing circuit 20 by synchronizing each other, and obtain information of the sensor driving signal Tx at the time of detection, etc., from the data included in the dataset (Data). Thus, the application processor 40 can appropriately calculate raw data (Raw data). According to the electronic apparatus of the embodiment and the control method of the electronic apparatus, for example, various sensor controls such as noise removal and control of sensing sensitivity can be conducted at high speed with high accuracy.

Moreover, the application processor 40 can conduct control the display driver 30 and the sensing circuit 20 by synchronizing each other, and conduct a calculation process by using raw data which is three-dimensional information including a coordinate position and physical quantity instead of using the coordinate detected by the sensor. Therefore, the application processor 40 can control and manage the whole electronic apparatus, and conduct various calculation processes by the use of raw data. As a result, according to this embodiment, the detection accuracy can be improved compared with the conventional sensor.

In this embodiment, the structure of the application processor 40 may be realized by hardware or software. In either case, in the application processor 40, the display driver 30 and the sensing circuit 20 are controlled, and calculation is conducted by the use of raw data. Therefore, the structure of the display device 10, the sensing circuit 20 or the display driver 30 is not complicated. Thus, according to the embodiment, it is possible to provide an electronic apparatus which can be widely used and a method for controlling the electronic apparatus.

In the above explanation, the sensor-equipped display device comprises a liquid crystal display device as a display device. However, the sensor-equipped display device may comprise other display devices such as an organic electroluminescent display device.

In the examples shown in FIG. 2, etc., the structure of the liquid crystal display device is explained as the structure in which both the pixel electrode PE and the common electrode CE are provided on the array substrate AR. In other words, the structure of the liquid crystal display device mainly uses a lateral electric field (including a fringe electric field) such as an in-plane switching (IPS) mode and a fringe field switching (FFS) mode. However, the structure of the liquid crystal display device is not limited to this structure. At least, the pixel electrode PE may be provided on the array substrate AR, and the common electrode CE may be provided on either of the array substrate AR or the counter-substrate CT.

In the case of the structure which mainly uses a longitudinal electric field such as a twisted nematic (TN) mode, an optically compensated bend (OCB) mode and a vertically aligned (VA) mode, the common electrode CE is provided on the counter-substrate CT. Thus, the position at which the common electrode CE is provided may only be between the insulating substrate constituting the TFT substrate 12 and the insulating substrate 14 constituting the counter-substrate CT.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
 a sensor-equipped display device comprising a display device, and a sensor which outputs information for detecting a contact position on the display device;
 a display driver which comprises a plurality of setting tables, and based on one setting table selected from the plurality of setting tables, outputs an image display signal to the display device and outputs a driving signal to the sensor;
 a sensing circuit which outputs a dataset including three-dimensional information of a coordinate of a position on the display device and a physical quantity at the coordinate, the coordinate having been obtained based on the information; and
 an application processor which receives the dataset output from the sensing circuit,
 wherein the dataset includes an identification value of the selected setting table and a frequency of the driving signal at the time of detection,
 the application processor conducts an operational treatment of the three-dimensional information based on the identification value of the setting table, a sensor setting signal specifying a driving method of the sensor, and the frequency of the driving signal at the time of detection which have been received,
 the application processor determines that accuracy of the contact position obtained based on the three-dimensional information is low, and changes the sensor setting signal and outputs, to the sensing circuit, a table selection signal specifying a setting table to be selected and the sensor setting signal when the application processor determines that the accuracy is low,
 the setting table includes timing for writing the image display signal, and a length of a period during which the sensor operates,
 the sensing circuit changes the period by outputting a table selection request signal generated based on the table selection signal, and a control signal which controls driving timing of the sensor to the display driver, the control signal having generated based on the sensor setting signal, and
 the sensor setting signal includes a frequency and pulse number of the driving signal.

2. The electronic apparatus according to claim 1, wherein the sensor-equipped display device comprises a plurality of first electrodes provided at a matrix state, a second electrode which is provided to face the first electrodes and includes a plurality of electrode patterns extending along a first direction and provided in line in a second direction intersecting with the first direction, and a third electrode which is provided to face the second electrode and includes a plurality of electrode patterns extending along the second direction and provided in line in the first direction, and
the three-dimensional information is a coordinate of a position at which the plurality of electrode patterns of the second electrode intersect with a plurality of electrode patterns of the third electrode, and a capacitance value between electrodes or a detection electrode voltage value at the coordinate.

3. The electronic apparatus according to claim 2, wherein the application processor changes the table selection signal when the setting table to be selected in the display driver is changed, and
the sensing circuit changes the table selection request signal based on the changed table selection signal.

4. The electronic apparatus according to claim 1, wherein the application processor changes the table selection signal and outputs the table selection signal to the display driver to cause the display driver to select the setting table in which the period is different when the application processor determines that the accuracy of the contact position obtained based on the three-dimensional information is low.

5. An electronic apparatus comprising:
 a sensor-equipped display device comprising a display device, and a sensor which outputs information for detecting a contact position on the display device;

a display driver which comprises a plurality of setting tables, and based on one setting table selected from the plurality of setting tables, outputs an image display signal to the display device and outputs a driving signal to the sensor;

a sensing circuit which outputs a dataset including three-dimensional information of a coordinate of a position on the display device and a physical quantity at the coordinate, the coordinate having been obtained based on the information; and an application processor which receives the dataset output from the sensing circuit, wherein the dataset includes an identification value of the selected setting table and a frequency of the driving signal at the time of detection, the application processor conducts an operational treatment of the three-dimensional information based on the identification value of the setting table, a sensor setting signal specifying a driving method of the sensor, and the frequency of the driving signal at the time of detection which have been received, the application processor changes the sensor setting signal and outputs, to the sensing circuit, a table selection signal specifying a setting table to be selected and the sensor setting signal when the application processor determines that accuracy of the contact position obtained based on the three-dimensional information is low, the sensor setting signal includes a frequency and pulse number of the driving signal, the setting table includes timing for writing the image display signal, and a length of a period during which the sensor operates, and the sensing circuit changes a frequency of the sensor by outputting a table selection request signal generated based on the table selection signal, and a control signal which controls driving timing of the sensor to the display driver, the control signal having generated based on the sensor setting signal.

6. The electronic apparatus according to claim 5, wherein the sensor-equipped display device comprises a plurality of first electrodes provided at a matrix state, a second electrode which is provided to face the first electrodes and includes a plurality of electrode patterns extending along a first direction and provided in line in a second direction intersecting with the first direction, and a third electrode which is provided to face the second electrode and includes a plurality of electrode patterns extending along the second direction and provided in line in the first direction, and the three-dimensional information is a coordinate of a position at which the plurality of electrode patterns of the second electrode intersect with a plurality of electrode patterns of the third electrode, and a capacitance value between electrodes or a detection electrode voltage value at the coordinate.

7. The electronic apparatus according to claim 6, wherein the application processor changes the table selection signal when the setting table to be selected in the display driver is changed, and the sensing circuit changes the table selection request signal based on the changed table selection signal.

8. The electronic apparatus according to claim 5, wherein the application processor changes and outputs the sensor setting signal to instruct the display driver to increase the frequency of the sensor when the application processor determines that the accuracy of the contact position obtained based on the three-dimensional information is low.

9. A control method of an electronic apparatus comprising a display device, a sensor which outputs information for detecting a contact position on the display device, and a display driver which outputs a driving signal to the sensor based on one setting table selected from a plurality of setting tables, and a sensing circuit which obtains information from the sensor, the method comprising:

outputting a signal indicating the setting table to be selected, and a sensor setting signal including a frequency and pulse number of the driving signal to the display driver;

obtaining, from the display driver, a value identifying the selected setting table, and the frequency of the driving signal at the time of detection;

obtaining information from the sensor;

obtaining three-dimensional information of a coordinate of a position on the display device and a physical quantity at the coordinate from the information based on the value identifying the setting table and the signal indicating the setting table to be selected;

conducting an operational treatment of the three-dimensional information based on the identification value of the setting table, the sensor setting signal, and the frequency of the driving signal at the time of detection;

outputting a table selection signal to instruct the display driver to select the setting table in which a period during which the sensor operates is changed, in response to determining that accuracy of the contact position obtained based on the three-dimensional information is determined to be low, wherein the setting table included timing for writing the image display signal, and a length of the period during which the sensor operates; and outputting the sensor setting signal, in which the frequency of the sensor is changed, to the display driver, in response to determining that accuracy of the contact position obtained based on the three-dimensional information is determined to be low.

10. The control method according to claim 9, further comprising:

changing the signal indicating the setting table to be selected, and outputting the signal to the display driver; and obtaining the value identifying the selected setting table from the display driver, and determining if the setting table is changed and selected.

11. The control method according to claim 9, further comprising changing the table selection signal and outputting the table selection signal to the display driver to cause the display driver to select the setting table in which the period is different when the accuracy of the contact position obtained based on the three-dimensional information is determined to be low.

12. The control method according to claim 9, further comprising changing and outputting, via the sensing circuit, the sensor setting signal to instruct the display driver to increase the frequency of the sensor when the accuracy of the contact position obtained based on the three-dimensional information is determined to be low.

* * * * *